(12) United States Patent
Matthews, III et al.

(10) Patent No.: US 8,967,520 B2
(45) Date of Patent: Mar. 3, 2015

(54) WIRE RETAINING RING FOR A WELDING SYSTEM

(75) Inventors: Herbert Matthews, III, Willoughby Hills, OH (US); Paul A. Weissbrod, South Euclid, OH (US)

(73) Assignee: Lincoln Global, Inc., City of Industry, CA (US)

( * ) Notice: Subject to any disclaimer, the term of this patent is extended or adjusted under 35 U.S.C. 154(b) by 445 days.

(21) Appl. No.: 13/429,490

(22) Filed: Mar. 26, 2012

(65) Prior Publication Data

US 2013/0126663 A1    May 23, 2013

Related U.S. Application Data

(63) Continuation-in-part of application No. 13/302,491, filed on Nov. 22, 2011, now Pat. No. 8,752,782.

(51) Int. Cl.
| | |
|---|---|
| *B65H 59/02* | (2006.01) |
| *B65H 49/12* | (2006.01) |
| *B23K 9/133* | (2006.01) |
| *B65H 57/18* | (2006.01) |

(52) U.S. Cl.
CPC .............. *B65H 49/12* (2013.01); *B23K 9/1333* (2013.01); *B65H 57/18* (2013.01); *B65H 2701/36* (2013.01)
USPC ...................... 242/423.1; 242/128; 242/156.1

(58) Field of Classification Search
CPC ...... B23K 9/1333; B65H 57/18; B65H 59/02; B65H 49/12; B65H 49/2701; B65H 49/36
USPC ........ 242/156, 156.1, 156.2, 423.1, 566, 593, 242/128, 125.3, 172, 419, 157 R
See application file for complete search history.

(56) References Cited

U.S. PATENT DOCUMENTS

| 2,869,719 A | 1/1959 | Hubbard |
|---|---|---|
| 4,097,004 A | 6/1978 | Reese |

(Continued)

FOREIGN PATENT DOCUMENTS

| GB | 2332451 | 6/1999 |
|---|---|---|
| JP | 60001583 U | 1/1985 |

(Continued)

OTHER PUBLICATIONS

Tri-Clover Butterfly Valves; Tri Clover, 1999; http://www.twincoinc.com/PDF/Alfa%20 Laval/03_Valves/Manuals/B51Aservice.pdf.

(Continued)

*Primary Examiner* — William A Rivera
(74) *Attorney, Agent, or Firm* — Hahn Loeser & Parks LLP; Shannon V. McCue (57) ABSTRACT

The subject embodiments are directed to a system to allow an uninterrupted flow of a coil welding wire from one container to another container, the coil of welding wire including a coil top and a coil bottom. Each container includes at least one vertically extending side wall, a closed bottom, a top opening for removing the welding wire and a wire coil receiving cavity within the outer packaging for receiving the wire coil, the feeding end and the trailing end being positionable near the top opening. A wire retaining ring is disposed on the coil top in the container and another said container, the wire retaining ring includes a slot that extends radially from a center of the coil to allow the trailing end of the coil to be drawn at a location away from the center of the coil.

14 Claims, 8 Drawing Sheets

(56) References Cited

U.S. PATENT DOCUMENTS

| | | | |
|---|---|---|---|
| 4,739,947 A | 4/1988 | Anseel et al. | |
| 5,105,943 A | 4/1992 | Lesko et al. | |
| 5,819,934 A | 10/1998 | Cooper | |
| 6,827,217 B2 | 12/2004 | Matsuguchi et al. | |
| 6,938,767 B2 | 9/2005 | Gelmetti | |
| 7,004,318 B2 | 2/2006 | Barton | |
| 7,017,742 B2 | 3/2006 | Dragoo et al. | |
| 7,152,735 B2 | 12/2006 | Dragoo et al. | |
| 7,220,942 B2 * | 5/2007 | Barton et al. | 219/137.2 |
| 7,398,881 B2 | 7/2008 | Barton et al. | |
| 7,467,712 B2 | 12/2008 | Carroscia | |
| 7,721,985 B2 | 5/2010 | Weissbrod et al. | |
| 7,748,530 B2 | 7/2010 | Hsu et al. | |
| 7,748,659 B2 | 7/2010 | Fabian | |
| 7,798,326 B2 | 9/2010 | Hsu et al. | |
| 7,938,352 B2 | 5/2011 | Fabian | |
| 7,950,523 B2 | 5/2011 | Gelmetti | |
| 8,313,054 B2 * | 11/2012 | Carroscia et al. | 242/423.1 |
| 8,752,782 B2 * | 6/2014 | Matthews, III | 242/423.1 |
| 2001/0006184 A1 | 7/2001 | Ohike et al. | |
| 2004/0155090 A1 * | 8/2004 | B.-Jensen | 228/41 |
| 2004/0211851 A1 | 10/2004 | Barton et al. | |
| 2006/0196794 A1 | 9/2006 | Nicklas | |
| 2007/0074987 A1 | 4/2007 | Dragoo et al. | |
| 2011/0042254 A1 | 2/2011 | Gelmetti | |
| 2011/0186677 A1 * | 8/2011 | Carroscia et al. | 242/588.3 |

FOREIGN PATENT DOCUMENTS

| | | |
|---|---|---|
| JP | S601583 | 8/1985 |
| JP | S61160140 | 3/1986 |
| JP | 61160140 U | 10/1986 |
| WO | 9852844 | 11/1998 |
| WO | 9852844 A1 | 11/1998 |

OTHER PUBLICATIONS

International Search Report and Written Opinion dated Mar. 14, 2013 for Intl. Application No. PCT/IB2012/002413.

International Search Report and Written Opinion dated Jun. 17, 2013 (PCT/IB2013/000514).

* cited by examiner

WIRE RETAINING RING FOR A WELDING SYSTEM

CROSS REFERENCE TO RELATED APPLICATIONS

This application is a continuation-in-part of and claims priority to U.S. patent application Ser. No. 13/302,491, filed Nov. 22, 2011, the entire content of which is incorporated by reference herein.

TECHNICAL FIELD

The present disclosure is related to welding systems, and more particularly, to a wire retaining ring for dispensing coiled wire from a plurality of containers to a welding system.

BACKGROUND OF THE INVENTION

Wire is frequently packaged and stored in containers for delivery to an end user. In particular, wire such as that used for welding or soldering, is wound in coils as it is packaged in drums or containers. Once shipped to the end user, the wire is dispensed from the container for use in any number of processes. In many instances, the wire is left in the container and metered out as needed without removing the entire coil. To facilitate easy removal, suppliers frequently incorporate a twist in the wire as it is fed into the drum. This helps the wire emerge without rotating as it is drawn back out.

Dispensing wire from coils, however, presents the problem of unwinding the wire smoothly without intertwining or forming knots, which can lead to defects or breaks in the wire resulting in costly downtime. The wire may tangle in any number of ways. For example, multiple loops of wire may lift off from the top of the coil at the same time entangling the wire as it drawn from the drum. In other instances, loops of wire may unravel and fall behind the coil causing the wire to intertwine. Systems and methods are needed to overcome these and other deficiencies.

BRIEF DESCRIPTION

In an embodiment, a system for packaging and unwinding a coil of welding wire is employed to allow an uninterrupted flow of the welding wire from one container to another container. The coil of welding wire includes a coil top and a coil bottom, wherein a feeding end of the welding wire extends from the coil top and a trailing end of the wire extends from the coil bottom, the trailing end of the one container being joinable to the feeding end of the another container. The system includes at least two containers, each container including at least one vertically extending side wall, a closed bottom, a top opening for removing the welding wire and a wire coil receiving cavity within the outer packaging for receiving the wire coil, the feeding end and the trailing end being positionable near the top opening. A wire retaining ring is disposed on the coil top in the container and another said container. The wire retaining ring includes a discontinuous inner ring that has an inner radius and an inner gap. An outer ring has an outer radius, which is greater than the inner radius, the outer ring is substantially concentrically disposed with regard to the inner ring. A plurality of spokes each extend radially from the inner ring to the outer ring, the plurality of spokes intersect the outer ring to create a plurality of segments along a circumference of the outer ring. A plate extends radially from the inner ring to the outer ring, and the plate includes a slot having a slot width. The slot defines a discontinuity in the inner ring and extends in an arc from the inner ring to a position radially inward of the outer ring. The slot is disposed in a location in place of one of the plurality of spokes, and the trailing end of the wire is positioned within the slot.

In another embodiment, a system for packaging and unwinding a coil of welding wire is employed to allow an uninterrupted flow of the welding wire from one container to another container. The coil of welding wire includes a coil top and a coil bottom, wherein a feeding end of the welding wire extends from the coil top and a trailing end of the wire extends from the coil bottom, the trailing end of the one container being joinable to the feeding end of the another container. The system includes at least two containers, each container including at least one vertically extending side wall, a closed bottom, a top opening for removing the welding wire and a wire coil receiving cavity within the outer packaging for receiving the wire coil, the feeding end and the trailing end being positionable near the top opening. A wire retaining member is disposed on the coil top in the container and another said container. The wire retaining member includes a planar body having a perimeter, an outer wall extending upwardly from the perimeter of the body, an inner wall extending upwardly from the body and defining an aperture at the center of the body, and a slot having a slot width, where the slot defines a discontinuity in the inner wall and extends in an arc from the inner wall to a position radially inward of the outer wall. The trailing end of the first coil of wire is positioned within the slot.

In still another embodiment, a wire retaining ring configured for disposition on top of a coil of wire comprises an inner ring having an inner radius, an outer ring having an outer radius, where the outer radius is larger than the inner radius and the outer ring is substantially concentrically disposed with regard to the inner ring, and a plurality of spokes each extending radially from the inner ring to the outer ring. The plurality of spokes intersect the outer ring to create a plurality of segments along a circumference of the outer ring. A plate extends radially from the inner ring to the outer ring. The plate includes a slot having a slot width, where the slot defines a discontinuity in the inner ring and extends in an arc from the inner ring to a position radially inward of the outer ring. The slot is disposed in a location in place of one of the plurality of spokes, and the plate further includes a tab extending partially across the slot at a location proximate the discontinuity in the inner ring.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Referring now to the figures, several embodiments or implementations of the present invention are hereinafter described in conjunction with the drawings, wherein like reference numerals are used to refer to like elements throughout. The subject embodiments are directed to a wire retaining ring that is employed to move a trailing end out of the center of a wire coil thereby mitigating the potential for entanglement of the trailing end with a feeding end. For this purpose, the wire retaining ring is disposed on top of the wire coil and includes a slot extending radially outward from the center of the ring to the outer periphery of the wire coil to position the trailing end. Although illustrated and described hereinafter in the context of various exemplary welding systems, the invention is not limited to the illustrated examples.

More particularly, the subject embodiments relate to an endless bulk wire container arrangement, wherein a first container contains a coil of wire that includes a coil top and a coil bottom, wherein a feeding end of the coil is drawn from the coil top from an opening in the center of the coil. A trailing end from the coil is also drawn from the center of the coil thereby causing a potential tangling hazard between the feeding end and the trailing end during a wire feeding operation. The subject embodiments are directed to a wire retaining ring that is employed to move the trailing end out of the center of the wire coil thereby mitigating the potential for entanglement between wire ends. For this purpose, the wire retaining ring is disposed on top of a wire coil and includes a slot extending radially outward from the center of the ring to the outer periphery of the wire coil. In this manner, when a container is opened, the trailing end can be manually positioned radially outward in the slot formed in the retaining ring into a corner of the container where it poses no entangling hazard. The trailing end may be connected to a coil within a different container to provide an endless supply of wire to a welder. This arrangement can be implemented repeatedly as suitable to effectively provide an endless supply of wire to a welding system.

Figure 1:
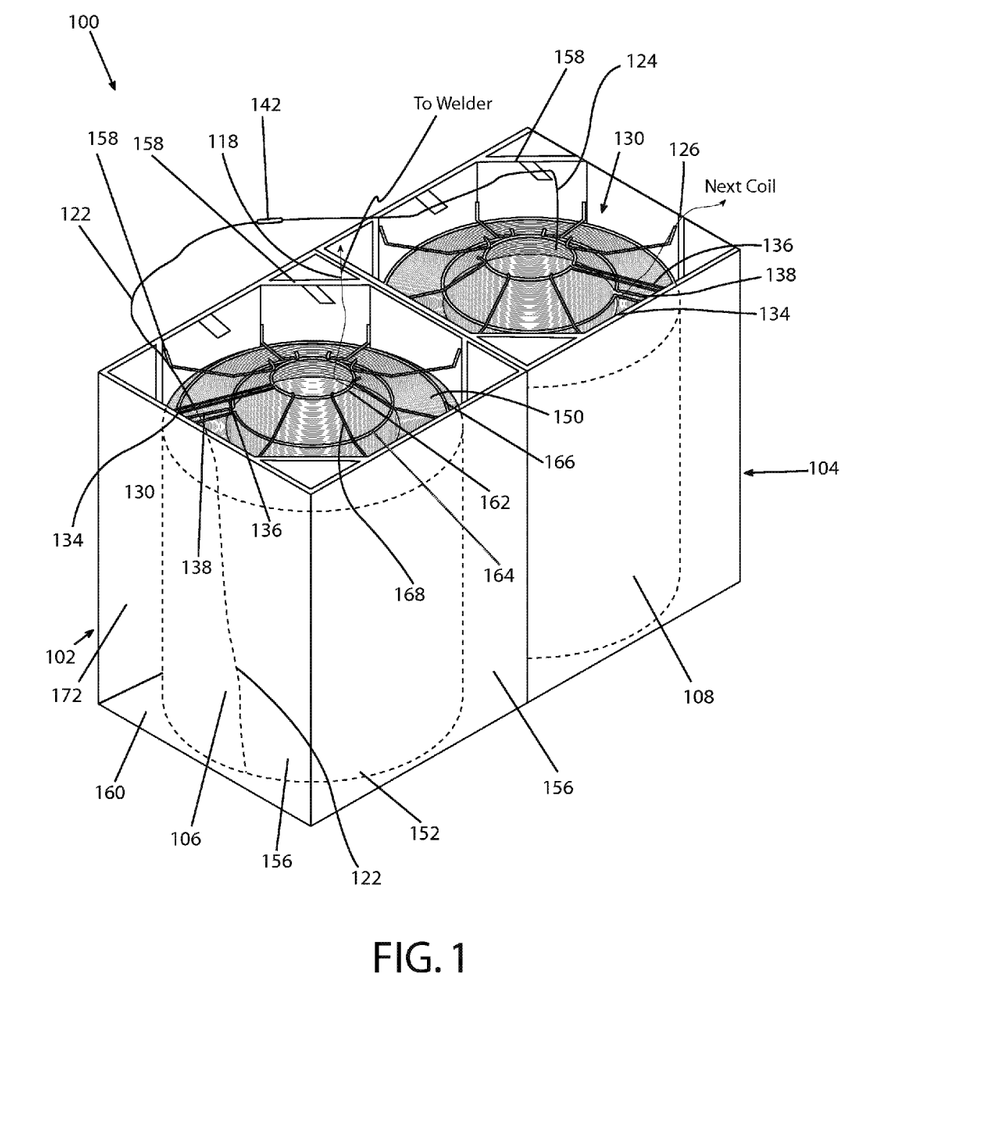
FIG. 1 is a perspective view of an endless bulk wire system that includes wire retaining rings to locate a trailing end of wire from a coil into a location that mitigates entanglement hazards.

FIG. 1 illustrates a coil system 100 that facilitates an endless wire supply for delivery to a welding system, such as an electric or arc welder. The subject embodiments relate to a plurality of wire coils which are interconnected to facilitate delivery of weld wire to a welding system and mitigating tangling or other encumbrance that may occur as wire is paid out from the coil. A first container 102 is adjacent a second container 104, wherein the first container 102 houses a wire coil 106 and the second container 104 houses a wire coil 108. The coils 106, 108 contain a quantity of welding wire which coil to form a hollow body with a ring-shaped cross section. In FIG. 1, the containers 102, 104 have a plurality of walls disposed in the interior of the container to mitigate coil movement during shipping or other transport. The first wire coil 106 has a feeding end 118 which is paid out to a weld system or other suitable receiving component. A trailing end 122 is welded, fused, or otherwise coupled to a feeding end 124 of the second coil at a location 142.

First container 102 and second container 104 are positioned side-by-side whereby the wire is fed from container 102 and then automatically changed over to feed wire from container 104. After the wire in container 102 is exhausted, the wire in container 104 is then pulled from the second container which is ultimately moved in the position of the first container and the vacant location of the second container is filled by a subsequent supply of coil wire. The two wires are connected (e.g., via a standard butt weld) to create an endless welding wire. The term "endless" as used herein means that there are at least two containers at an installation with the trailing end of the wire in the first container 102 connected to the feeding end 124 of the second coil 108 of wire in the second container 104. Similarly, the trailing end 126 of the second coil 108 of wire can subsequently be connected to another container and so on.

The containers can be circular drums, square cardboard containers with one or more vertical walls, or any container suitable for storage and payout of welding wire. The containers shown in FIG. 1 include a supply of welding wire in the form of coils 106, 108 having wire with feeding ends 118, 124 and trailing or trailing ends 122, 126, respectively. When transported, the trailing end of the coil is loose and the feeding end is pulled from the coil until the trailing end at the bottom of the coil is reached. At that time, the trailing end is connected to the feeding end of the next coil so there is an automatic change over from one coil to the next. To illustrate the disposition of the trailing end of the coil when the container is shipped, trading end 122 of coil 106 is illustrated as originating from the bottom portion 152 of coil 106. Thus, when coil 106 is exhausted, the last portion of the coil pulled from the container is trailing or trailing end 122. This is the end that is ultimately connected (e.g., butt welded) to a feeding end of the next coil when the coil 106 is exhausted and replaced by a changeover to coil 108 shifted to the position of the first (empty) container 102.

The wire coil 106 further includes the feeding end 118 extending between coil 106 near top 150; and the trailing end 122 extending from wire coil 106 from near coil bottom 154. The feeding end 118 is fed from the center of the coil to a welding operation. The trailing end 122 is positioned such that it extends from near bottom across the bottom of the coil and then up wall 172, and toward the center of the coil 106. Similarly, the wire coil 108 further includes the feeding end 124 that is drawn from the top 152 from the center of the coil 106. The trailing end 126 of the second coil is positioned from the bottom 154 of the coil 108 to be connected to a subsequent coil placed once the first coil 106 has been depleted. Wire coils 106, 108 can be any coil known in the art wound by any known winding techniques in the art and can include a coil bottom positioned on a package bottom and an oppositely facing coil top. Wire coils 106, 108 further include a cylindrical outer surface and a cylindrical inner surface, which extend between coil bottom and coil top. Due to the method in which the wire welding is wound into containers 102, 104, the individual convolutions of wire 106, 108 can have a natural cast which produces a radial outward force in the coil and an upward springing force in the coil. The upward springing force is maintained and controlled by a wire retaining ring 130, which will be discussed in greater detail below. The radial outward force of the coils 106, 108 is controlled, at least in part, by the walls of containers 102, 104.

The interior of containers 102, 104 are configured to receive the wire coils 106, 108 respectively. In one embodiment, the containers 102, 104 may be drum-like having a circular cross-section. Alternative embodiments incorporate cubical containers having four side walls 156 connected together by a floor panel 160. Inserts may be added that create a polygonal boundary inscribing the outer perimeter of the coiled wire 106, 108. In particular, corner inserts 158 may be placed vertically within the container 102, 104 creating an octagonal boundary. While not shown, containers 102, 104 can also include inner packaging components, such as a vertically extending liner, vapor barriers, hold-down mechanisms, or other welding wire packaging components. Additionally, containers 102, 104 may be covered by a container lid, not shown, constructed to prevent debris and other contaminants from entering each container.

Figure 2:
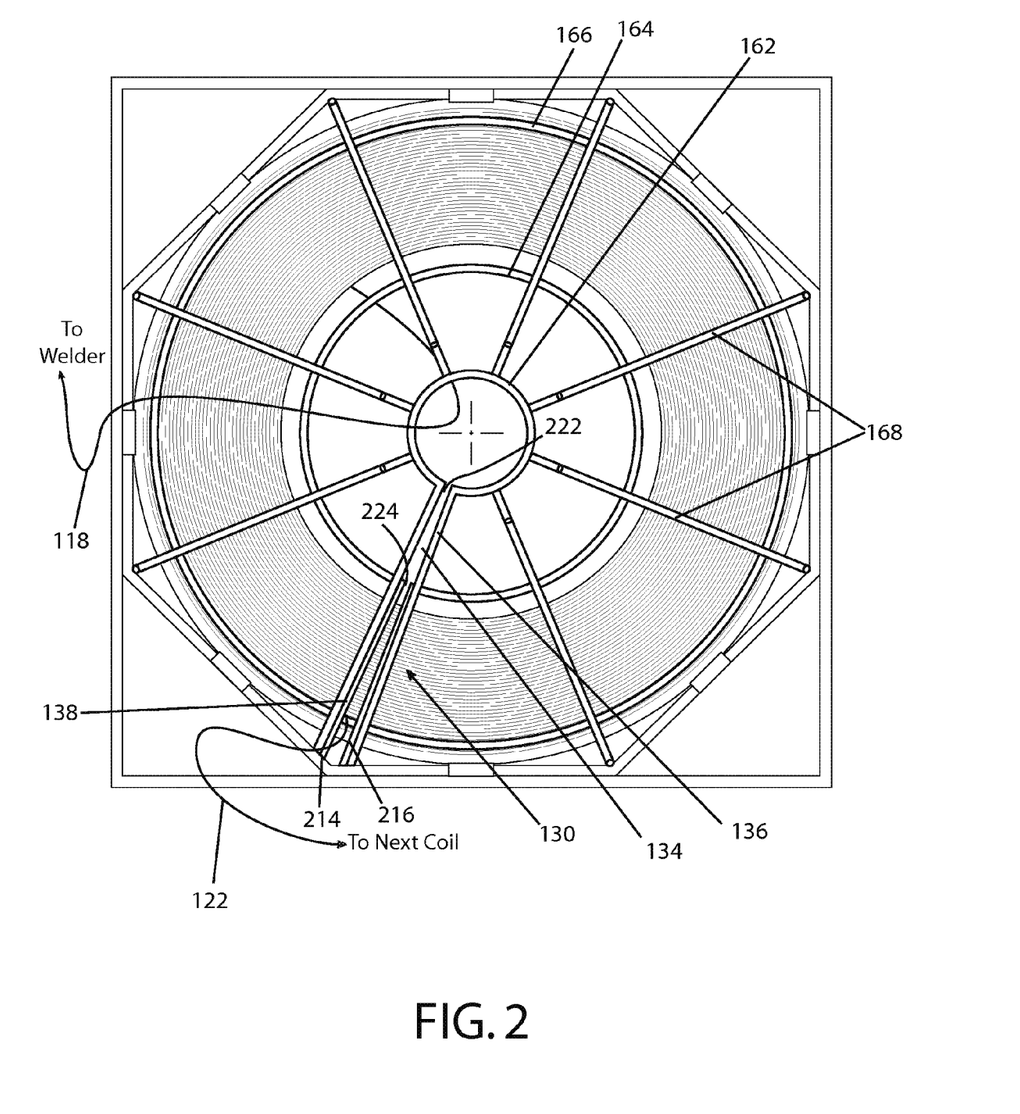
FIG. 2 is a top plan view of a wire coil with a wire retaining ring.
Figure 4:
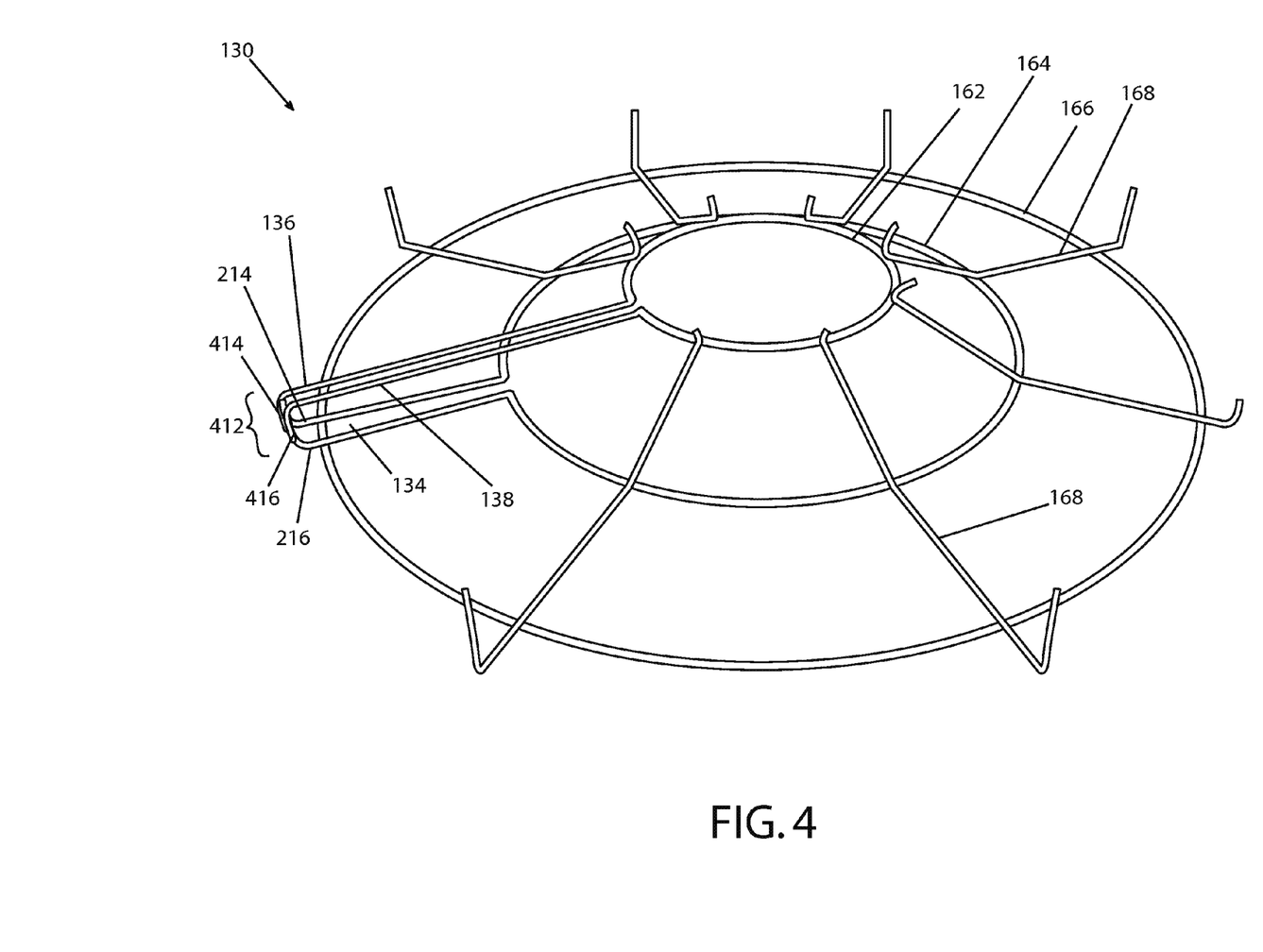
FIG. 4 is a top perspective view of the first embodiment of the wire retaining ring.

Wire retaining rings 130 are disposed on the top of the coil within the containers 102, 104 respectively. As illustrated in FIG. 1, the wire retaining ring 130 includes three concentrically disposed discontinuous rings: an inner ring 162, an intermediate ring 164 and an outer ring 166. The inner ring is coupled to the intermediate ring and the outer ring via a plurality of spokes 168 which are disposed at arc intervals preferably regularly spaced around the inner ring, as illustrated. The spokes 168 can have upward extensions both at the inner ring 162 and proximate the outer ring 166. Alternatively, or in addition, the spokes 168 may extend beyond the radius of the outer ring 166 for abutment against the inside wall (e.g., within corners) of containers 102, 104. The wire retaining ring 130 contains a slot 134 which, as shown in FIG. 2, is defined by a first slot rail 136 and a second slot rail 138. The slot 134 can be located in place of a spoke 168 for structural consistency and is illustrated in FIGS. 2 and 4 and extends from the inner ring 162 to the outer ring 166 wherein the inner ring includes an inner gap 222 and intermediate ring includes an intermediate gap 224 to accommodate a continuous slot. In one embodiment, the slot 134 is a single slot that extends from the inner ring 162 to the outer ring 166. As best described in FIG. 4, the slot is comprised of the first slot rail 136 and a second slot rail 138, which extends from the inner ring 162 to the outer ring 166.

As shown in FIG. 4, a connecting element 412 is disposed at the outer ring 166, which includes a first vertical rail 414 that connects the first slot rail 136 to a first supplementary rail 214. A second vertical rail 416 within the connecting element 412 connects the second slot rail 138 to a second supplementary rail 216. In such configuration, the trailing end 122 can be moved away from the center of the coil similar to the first embodiment wherein a redundant slot arrangement is employed. Regardless of the slot arrangement, however, substantially any configuration is contemplated which moves a trailing end away from the payout location in the center of the coil to ensure that no entanglement incurs and to allow for a simplistic connection from the trailing end 122 to the feeding end of a different coil (e.g., feeding end 124). In this manner, the trailing end 122 from the first wire coil 106 can be disposed and held at a location which is distal from the center of the wire coil 106. While the feeding end of the wire 118 is paid out to a welder or other receiving component, the trailing end wire 122 will not interfere with such payout as to avoid entanglement or other negative consequence of interference between wire ends. While connecting elements 412 are illustrated as extend beyond the periphery of outer ring 166, there is no need to limit the design as such as connecting elements may terminate at the peripheral edge or interiorly.

The wire retaining ring 130 can be made from a wide variety of materials, including, but not limited to a steel, an aluminum, a copper, a nickel, a stainless steel, and a brass. Alternatively or in addition, components within the wire retaining ring 130 can include thermoplastics, thermosets, terpolymers, and/or polymers. Polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethyl pentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA.

Thermoplastic polymers may also include styrenic polymers, such as polystyrene, poly-(p-methylstyrene), poly(.alpha.-methylstyrene), copolymers of styrene, p-methylstyrene or alpha-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or alpha-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of the styrenic copolymers indicated above.

Nitrile polymers are also useful. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, such as acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane]terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with poly-olefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

Regardless of material, it will be appreciated that by increasing thickness and/or substituting materials of construction of the rings 162, 164, 166, and spokes 168, the rigidity of wire retaining ring 130 can be varied to minimize deflection or distortion of the ring body during the operation of the unwinding of the welding wire from the wire coil. This variance in thickness of components is also commensurate with a variable weight, which can be used with different welding wire types and sizes. For example, the wire retaining ring 130 can have a weight range which varies relative to gauge of the welding wire, twist on the welding wire, welding wire material, and other relevant factors. In an embodiment, the wire retaining ring 130 has a weight of between 1 and 7 pounds, which can be calibrated for use with different wires, wherein different models of wire retaining ring have different weights as appropriate. For example, the wire retaining ring 130 may have a 5 pound total weight when used with a heavier gauge weld wire, whereas the wire retaining ring 130 has a 2 pound weight when used with a relatively finer gauge weld wire. The addition or elimination of spokes, and/or variation in material thickness can be employed to obtain desired weight results. In this manner, the wire retaining ring 130 will not interfere with the payout of the wire from the coils 106, 108 by under compressing or over-compressing the coil.

FIG. 2 illustrates a top plan view of the wire retaining ring 130 to illustrate the configuration of the inner ring 162, intermediate ring 164 and outer ring 166. As depicted, the discontinuous rings are concentrically disposed relative to one another and are coupled together via a plurality of spokes 168. It is to be appreciated that although only a single intermediate ring 164 is depicted, substantially any number of intermediate rings can be employed, including the elimination of an intermediate ring as suitable for each application. As shown, the trailing end 122 is illustrated as exiting the slot 134 and is disposed at a location distal from the inner ring. The feeding end 118 is paid out from the coil 106 through the inner ring into a receiving component such as a weld system.

Figure 3:
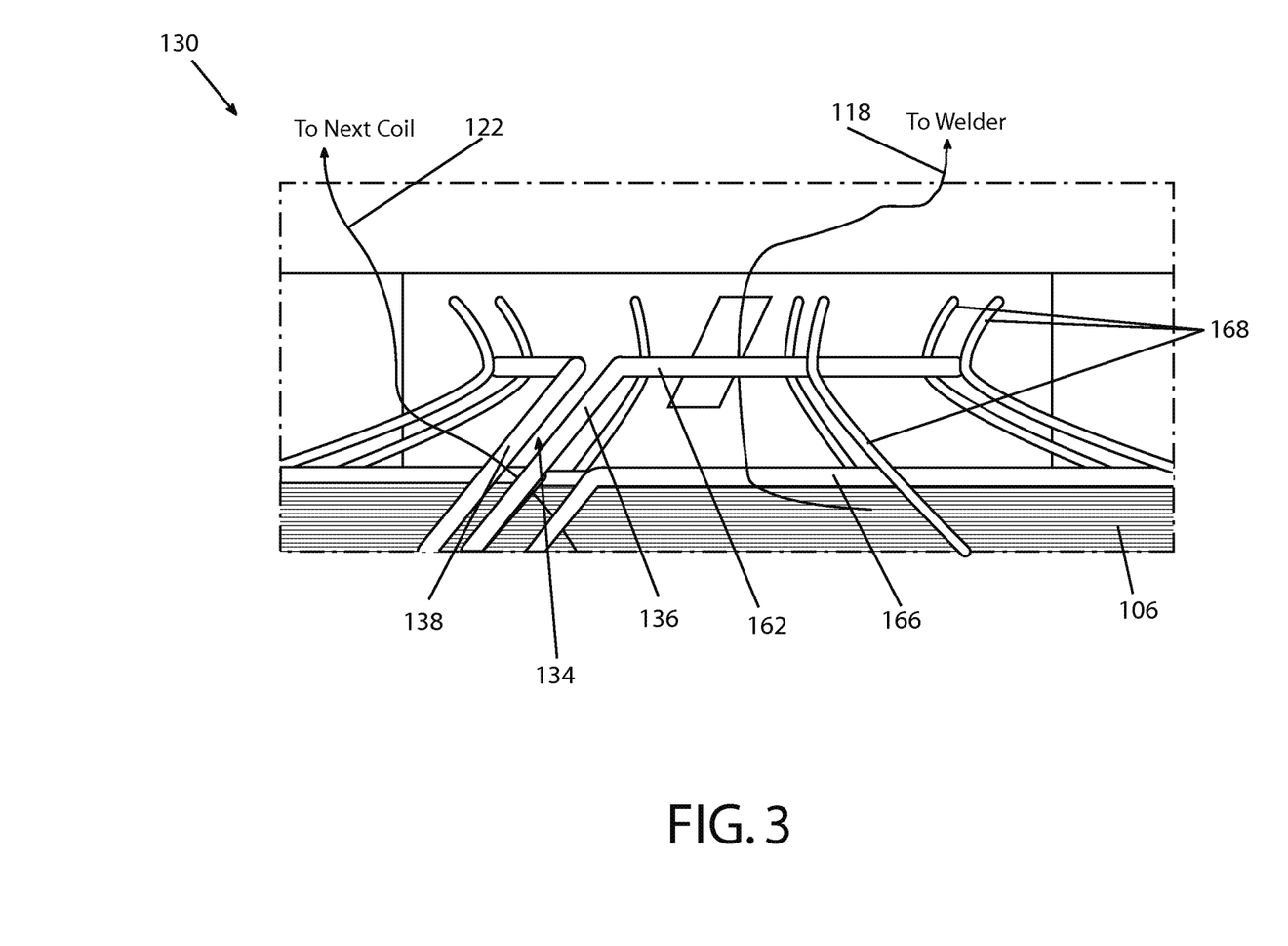
FIG. 3 is a front elevation view of a wire coil with a first embodiment of the wire retaining ring.

FIG. 3 illustrates an elevation of the horizontal planes defined by rings within the wire retaining ring 130. The inner ring 162 is shown as elevated in relation to the intermediate ring 164 and outer ring 166, to allow flexibility for the payout of the feeding end 118 from the coil 106. The height of the inner ring 162 relative to the intermediate and outer rings can vary and be equal to that of the intermediate and outer rings or lower than the intermediate and outer rings in various applications. The elevation of the intermediate ring 164 to the outer ring 166 is substantially equivalent. As the elevation of the inner ring 162 is higher than the intermediate ring 164 and the outer ring 166, the slot 134 can be upwardly angled toward the inner ring. This configuration can facilitate payout of wire through the inner ring in an upward direction from the coil and out of the respective container.

Figure 5:
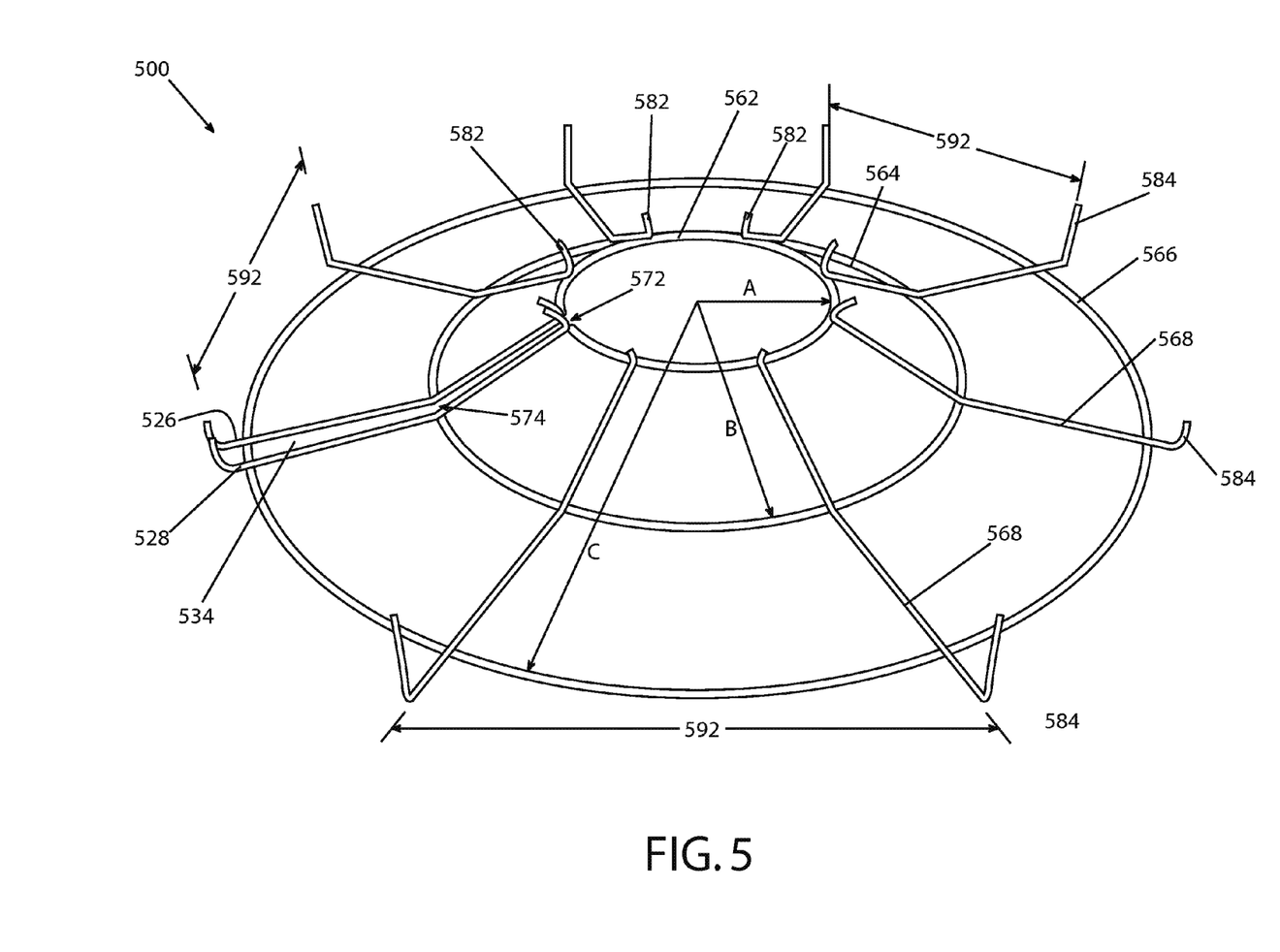
FIG. 5 is a top perspective view of a second embodiment of the wire retaining ring.
Figure 6:
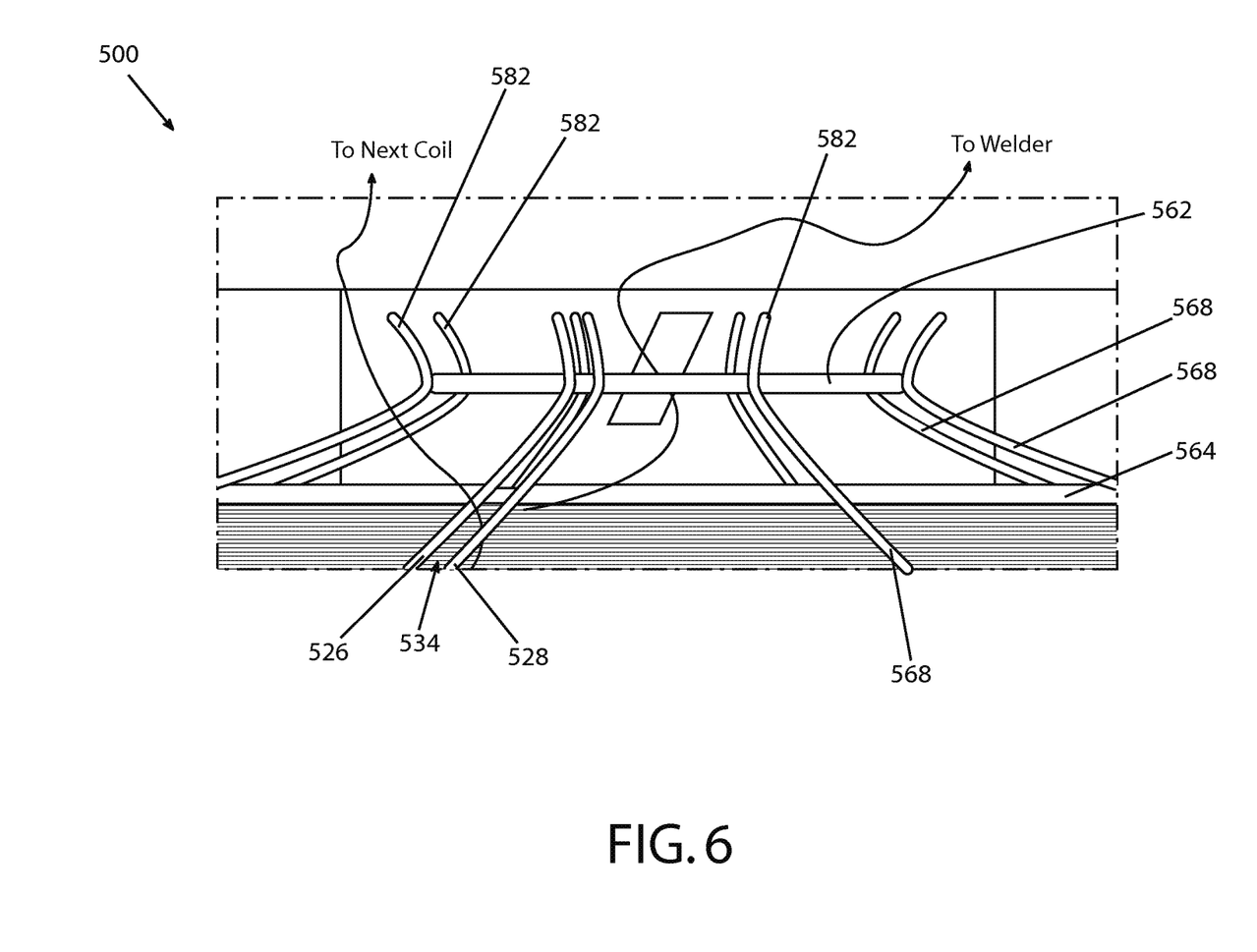
FIG. 6 is a front elevation view of the second embodiment of the wire retaining ring.

FIG. 5 is a top perspective view of a second embodiment of a wire retaining ring, which shows wire retaining ring 500. The wire retaining ring 500 includes a discontinuous inner ring 562, a discontinuous intermediate ring 564 and an outer ring 566, which are axially concentrically aligned to one another. The inner ring 562 has a radius A, the intermediate ring has a radius B, and the outer ring has a radius C, wherein radius C is greater than radius B and radius B is greater than radius A. In addition, an elevation of the horizontal plan defined by inner ring is greater than an elevation of the outer ring to accommodate wire drawn from the center of the inner ring 562 in an upward motion. An elevation of the intermediate ring 564 is substantially equal to the outer ring 566. The elevation of the inner ring 562 relative to the intermediate ring 564 is shown in FIG. 6.

A plurality of spokes 568 extend from the inner ring 562 to the outer ring 566 to provide structural support, additional weight to the wire retaining ring 500, and to maintain a location within a container. As the spokes are coupled to each of the rings 562, 564, and 566, the spokes are generally angled upward from the outer ring to the inner ring due to the elevation of the inner ring relative to the outer ring 566 and the intermediate ring 564. In an example, as shown in this embodiment, the wire retaining ring 500 has eight spokes 568 that each extend radially from the inner ring 562 to the outer ring 566. In a container with eight corners (e.g., at the intersections of eight vertical walls as shown in FIGS. 1 and 2 above), each spoke 568 is disposed within a corner to mitigate lateral movement of the wire retaining ring 500 within the container. The length of the spokes can be less than, substantially equal to, or greater than the radius C. In an embodiment, the spokes 568 are longer than the radius C. The spokes 568 intersect the outer ring to create a plurality of segments with an arc length 592 along the outer ring 566. As the spokes are disposed at a substantially equivalent offset angle around the outer ring, the segment distance between spokes have a substantially equivalent arc length 592. The spokes 568 have an inner end 582 and an outer end 584, wherein the distal ends 582 and 584 are bent at an angle of approximately 90 degrees in an upward direction. This feature can also mitigate entanglement hazards of the wire with the retaining ring 500.

A wire slot 534 is defined by a first slot rail 526 and a second slot rail 528, which both extend from the inner ring 562 to the outer ring 566. The wire slot 534 is generally located at a position in place of a spoke 568 to maintain general structural integrity, wherein an inner gap 572 at the inner ring and a intermediate gap 574 at the intermediate ring are made to facilitate a continuous slot from the inside to the outside of the wire retaining ring. In an embodiment, the width of the inner gap 572 is less than the width of the intermediate gap 574. It is to be appreciated, however, that the inner gap 572 can have a width that is substantially any size relative to the intermediate gap 574. Using the wire slot 534, a user can move the trailing end of a wire (e.g., trailing end 122) out of the inner ring 562 to location near the outer ring 566, such as between the intermediate ring 564 and the outer ring 566, as shown in FIG. 6. In the meantime, the feeding end of the wire is drawn from the inner ring to a weld operation. As the coil is depleted from the top to the bottom of the coil within the container, the wire is drawn up through the wire slot 534 wherein the trailing end is lifted out of a first container to become the leading end of a second coil within a second container. To facilitate this endless wire configuration, the trailing end is fused, welded, or otherwise connected to the leading end of the second coil. As subsequent coils can all include a wire retaining ring, the wire can effectively provide an endless supply of wire to a welding system while mitigating any entanglement related thereto.

Figure 7:
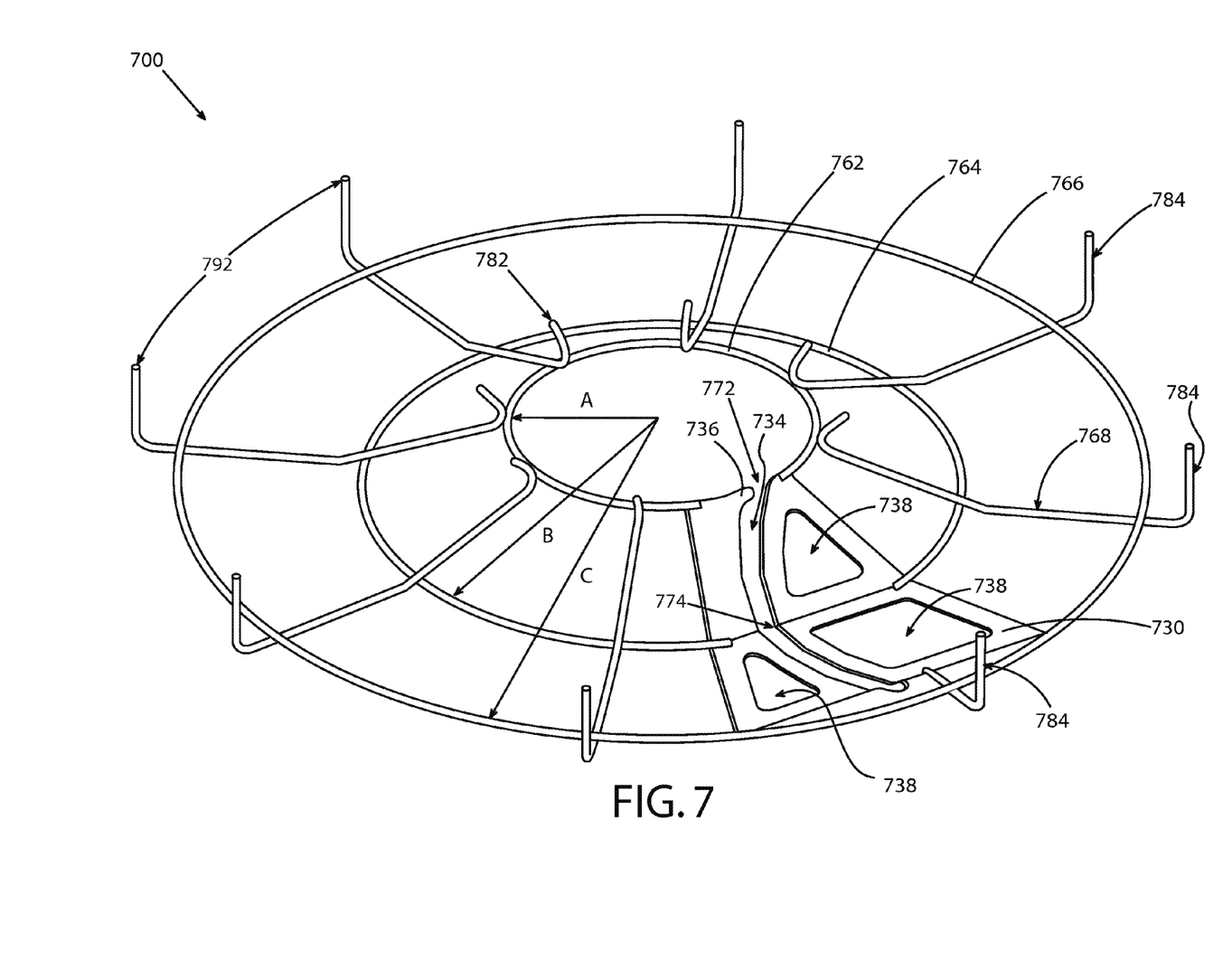
FIG. 7 is a top perspective view of a third embodiment of a wire retaining ring.

FIG. 7 is a top perspective view of a third embodiment of a wire retaining ring 700. The wire retaining ring 700 includes a discontinuous inner ring 762, a discontinuous intermediate ring 764, and an outer ring 766, which are axially concentrically aligned, or coaxial, to one another. The inner ring 762 has a radius A, the intermediate ring 764 has a radius B, and the outer ring 766 has a radius C, wherein radius C is greater than radius B and radius B is greater than radius A. In addition, an elevation of the horizontal plane defined by the inner ring 762 is greater than an elevation of the horizontal plane defined by the outer ring 766 to accommodate wire drawn from the center of the inner ring in an upward motion. The elevation of the horizontal plane defined by the intermediate ring 764 is substantially equal to the that of the outer ring 766.

A plurality of spokes 768 extend radially from the inner ring 762 to the outer ring 766 to provide structural support, additional weight to the wire retaining ring 700, and to maintain a location, or index, of the wire retaining ring 700 within a container. As the spokes are coupled to each of the rings 762, 764, and 766, the spokes are generally angled upward from the outer ring to the inner ring due to the elevation of the inner ring relative to the outer ring 766 and the intermediate ring 764. In an example, as shown in this embodiment, the wire retaining ring 700 has seven spokes 768 that each extend radially from the inner ring 762 to the outer ring 766. In a container with eight corners (e.g., at the intersections of eight vertical walls as shown in FIGS. 1 and 2 above), each spoke 768 is disposed within a corner to mitigate lateral or rotational movement of the wire retaining ring 700 within the container. The length of the spokes can be less than, substantially equal to, or greater than the radius C. In an embodiment, the spokes 768 are longer than the radius C. The spokes 768 intersect the outer ring to create a plurality of segments 792 with an arc length along the outer ring 766. As the spokes 768 are disposed at a substantially equivalent angle around the outer ring 766, the segments 792 have a substantially equivalent arc length. The spokes 768 have an inner end 782 and an outer end 784, wherein the out ends 784 are bent at an angle of approximately 90 degrees in an upward direction. In addition to reducing the movement of the ring 700 with a container, these upturned ends 782, 784 may also mitigate entanglement hazards of the wire with the retaining ring 700.

In the embodiment shown in FIG. 7, the wire retaining ring 700 also includes a plate 730. The plate 730 extends radially from the inner ring 762 to the outer ring 766 and is affixed to the ring 700 at the inner ring 762 and the outer ring 766. Additionally, the plate 730 may also be affixed to the intermediate ring 764. The plate 730 may be affixed to the rings 762, 764, 766 by welding, soldering, or other joining techniques known to one of ordinary skill in the art. A plurality of windows 738 are provided in the plate 730, and the absence of material provided by the windows decreases the amount of surface area of the plate for the welding wire to contact during payout, thereby decreasing the amount of friction to which the welding wire is subjected during payout from the wire container.

The plate 730 also includes a slot 734 having a slot width. The slot 734 defines a discontinuity or gap in the inner ring 762 and intermediate ring 764 and extends radially from the discontinuity in the inner ring to a position radially inward of the outer ring 766. A tab 736 is provided in the plate 730 and extends partially across the slot 734 at a location proximate the inner gap 764 or discontinuity in the inner ring 762. The tab 736 serves to narrow the slot 734 at the inner ring 762 so as to mitigate the welding wire being paid off from catching or sticking in the gap 734 during wire payout. While the tab 736 is provided as a projecting member from one wall of the slot 734, it is also envisioned that the slot 734 may be gradually tapered from the outer ring 766 toward the inner ring 762 so as to achieve the same benefit of the tab (not shown in FIG. 7). The slot 734 is curved or arcuate and is therefore said to extend in an arc from the inner ring 762 toward the outer ring 766, but alternately may extend linearly from the inner ring 762 toward the outer ring 766. The wire slot 734 is generally located at a position in place of a spoke 768 to maintain general structural integrity, wherein the discontinuity or gap 772 at the inner ring 762 and the discontinuity or gap 774 in the intermediate ring 764 are formed to facilitate a continuous slot from the inside to the outside of the wire retaining ring. In an embodiment, the width of the inner gap 772 is less than the width of the intermediate gap 774. It is to be appreciated, however, that the inner gap 772 can have a width that is substantially any size relative to the intermediate gap 774. Using the wire slot 734, a user can move the trailing end of a wire out of the inner ring 762 to location near the outer ring 766, such as between the intermediate ring 764 and the outer ring 766. In the meantime, the feeding end of the wire is drawn from the inner ring 762 to a weld operation. As the coil is depleted from the top to the bottom of the coil within the container, the wire is drawn up through the wire slot 734, wherein the trailing end of the wire is lifted out of a first container to become the leading end of a second coil within a second container. To facilitate this endless wire configuration, the trailing end is fused, welded, or otherwise connected to the leading end of the second coil. As subsequent coils can all include a wire retaining ring, the wire can effectively provide an endless supply of wire to a welding system while mitigating any entanglement related thereto.

The wire retaining ring 700 can be made from a wide variety of materials, including, but not limited to steel, aluminum, copper, nickel, stainless steel, brass, as well as the variety of metallic and plastic materials described hereinabove.

Figure 8:
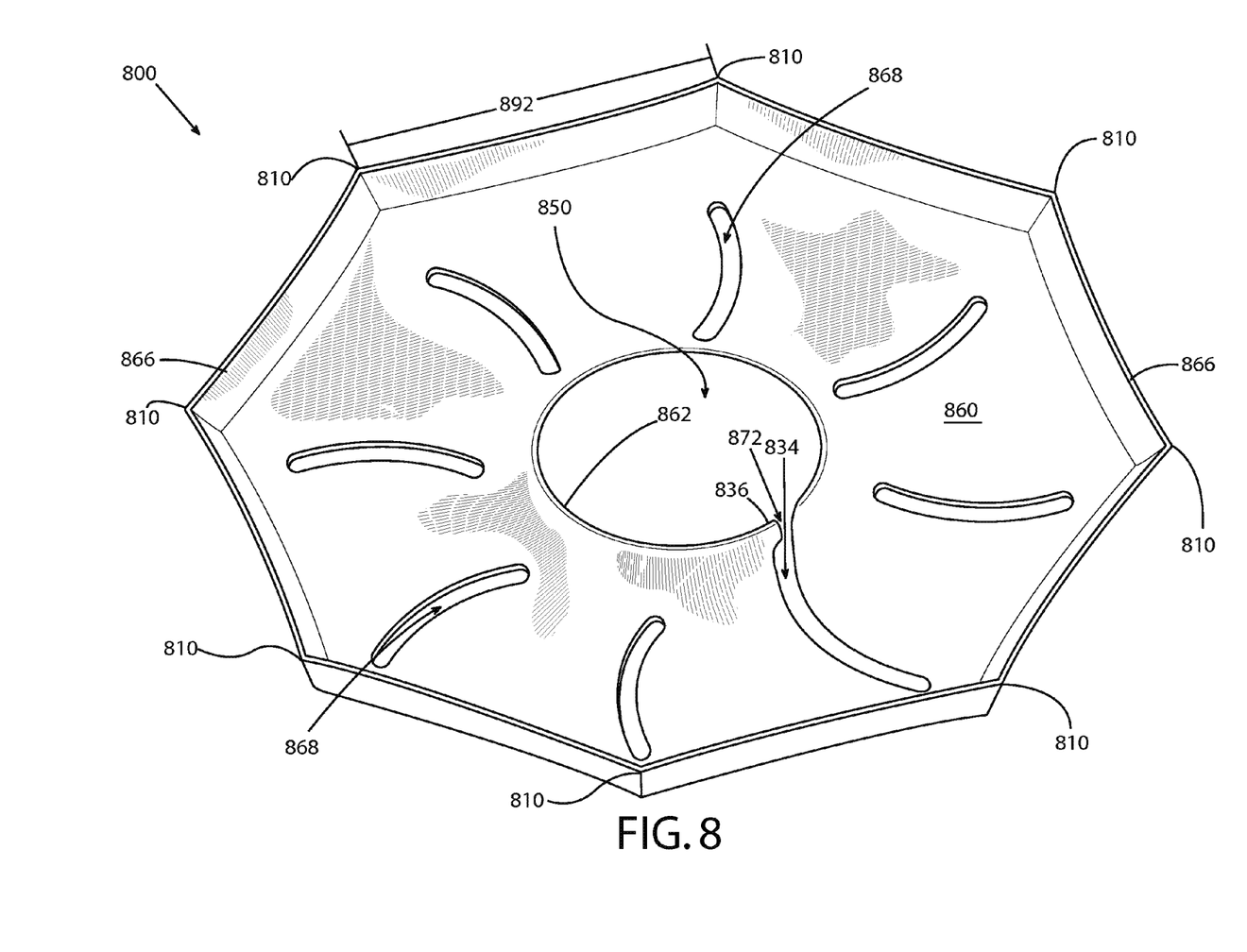
FIG. 8 is a top perspective view of an embodiment of a wire retaining member.

FIG. 8 is a top perspective view of a fourth embodiment of a wire retaining ring, which shows wire retaining member 800. The wire retaining member 800 includes a substantially planar body 860 which has a perimeter, an inner wall 862, and an outer wall 866. As shown in the embodiment of FIG. 8, the perimeter of the planar body is octagonal, and such a configuration is designed such that the number of corners 810 of the retaining member 800 is equal to the number of corners in the container of welding wire. When the retaining member 800 is placed in the welding wire container, this configuration mitigates lateral or rotational movement of the wire retaining ring within the container during payout of the welding wire. Of course, a circular perimeter and other polygonal perimeter shapes are also contemplated and may be configured so as to correspond to the interior shape of a variety of welding wire containers. The planar body 860 also contains a plurality of view slots 868, which are provided to allow a user to monitor the height of the welding wire within the container as the wire is paid off. The view slots 868 shown in FIG. 8 are spaced at equal intervals through the planar body and extend in an arc from the inner wall 862 toward the outer wall 866, although the slots may also extend in a straight line, diagonal line, or in other shaped slots from the inner wall toward the outer wall.

A tab 836 is provided in the inner wall 862 and extends partially across the slot 834 at a location proximate the discontinuity in the inner wall 862. The tab 836 serves to narrow the slot 834 at the inner wall 862 so as to mitigate the welding wire being paid off from catching or sticking in the gap 834 during wire payout. While the tab 836 is provided as a projecting member from one wall of the slot 834, it is also envisioned that the slot 834 may be gradually tapered from the outer ring 866 toward the inner ring 862 so as to achieve the same benefit of the tab.

In the embodiment shown in FIG. 8, the inner wall 862 is frustoconical in shape and extends upwardly from the substantially planar body 860. At its top, the inner wall 862 is circular in shape defines an aperture 850 located at the center of the planar body 860. When inserted in a container of welding wire, the aperture 850 is oriented no as to be coaxial with the longitudinal axis of the coil of welding wire. In other words, the aperture 850 and the coiled welding wire share a common axis. The outer wall 866 also extends upwardly from the substantially planar body 860 and extends continuously around the perimeter of the planar body. As is the case in FIG. 8, the outer wall 866 is provided in the form a plurality of walls which intersect at corners 810, where the number of corners 810 is equal to the number of corners on the interior of the container. In such a polygonal configuration, each wall is said to have a wall length 892, where the wall length is substantially equal to the length of an interior wall of the welding wire container.

In place of one of the view slots 868, a wire slot 834 is provided. The wire slot 834 has a slot width and defines a discontinuity or gap in the inner wall 862. The wire slot 834 extends radially from the discontinuity in the inner wall 862 to a position radially inward of the outer wall 866. The slot 834 is curved or arcuate and is therefore said to extend in an arc from the inner wall 862 toward the outer wall 866, but alternately may extend linearly from the inner wall toward the outer wall. The wire slot 834 is generally located at a position in place of a view slot 868 to maintain general structural integrity, wherein the inner gap 872 or discontinuity at the inner wall 862 is formed to facilitate a continuous slot from the inside to the outside of the wire retaining member 800. Using the wire slot 834, a user can move the trailing end of a wire out of the inner 862 to location near the outer wall 866. In the meantime, the feeding end of the wire is drawn from the inner wall 862 to a weld operation. As the coil is depleted from the top to the bottom of the coil within the container, the wire is drawn up through the wire slot 834, wherein the trailing end of the wire is lifted out of a first container to become the leading end of a second coil within a second container. To facilitate this endless wire configuration, the trailing end is fused, welded, or otherwise connected to the leading end of the second coil. As subsequent coils can all include a wire retaining ring, the wire can effectively provide an endless supply of wire to a welding system while mitigating any entanglement related thereto.

The wire retaining member 800 can be made from a wide variety of materials, including, but not limited to steel, aluminum, copper, nickel, stainless steel, brass, as well as the variety of metal and plastic materials described hereinabove.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements.

What is claimed is:

1. A system for packaging and unwinding a coil of welding wire to allow an uninterrupted flow of the welding wire from one container to another container, the coil of welding wire including a coil top and a coil bottom, a feeding end of the welding wire extends from the coil top and a trailing end of the wire extends from the coil bottom, the trailing end of the one container being joinable to the feeding end of the another container, the system comprising:

at least two containers, each container including at least one vertically extending side wall, a closed bottom, a top opening for removing the welding wire and a wire coil receiving cavity within the outer packaging for receiving the wire coil, the feeding end and the trailing end being positionable near the top opening:

a wire retaining ring that is disposed on the coil top in the container and another said container, the wire retaining ring including, a discontinuous inner ring that has an inner radius and an inner gap;

an outer ring that has an outer radius, which is greater than the inner radius, the outer ring is substantially concentrically disposed with regard to the inner ring:

at least two spokes that each extend radially from the inner ring to the outer ring, the spokes intersect the outer ring to create a plurality of segments along a circumference of the outer ring; and a plate extending radially from the inner ring to the outer ring, where the plate includes a slot having a slot width, the slot defining a discontinuity in the inner ring and extending in an arc from the inner ring to a position radially inward of the outer ring and disposed in a location in place of one of the plurality of spokes, wherein the trailing end of the first coil of wire is positioned within the slot.

2. The system of claim 1, wherein the wire retaining ring further includes a tab extending partially across the slot at a location proximate the discontinuity in the inner ring.

3. The system of claim 1, wherein the trailing end of the wire is disposed at a location close to the outer ring than the inner ring.

4. The system of claim 1, wherein the spokes bend at an angle of approximately 90 degrees in an upward direction at a location outside the outer ring.

5. The system of claim 1, the at least two containers each include a quantity of vertical walls, the number of spokes is equal to the quantity of vertical walls.

6. The system of claim 5, wherein the vertical walls are connected to one another in an end-to-end configuration around an interior portion of each container to create a quantity of corners that is equal to the quantity of walls, each spoke is placed within a corner.

7. The system of claim 1, further including:

a discontinuous intermediate ring located between the inner ring and the outer ring, the discontinuous intermediate ring is substantially axially concentrically disposed relative to the discontinuous inner ring and the outer ring and has an intermediate radius, the intermediate radius is greater than the inner radius and less than the outer radius.

8. The system of claim 7, wherein an elevation of the horizontal plane of the discontinuous intermediate ring is substantially equal to horizontal plane of the outer ring.

9. The system of claim 8, wherein the spokes are generally angled upward from the outer ring to the inner ring.

10. The system of claim 9, wherein the upward angle of the spokes is greater from the discontinuous intermediate ring to the discontinuous inner ring than from the outer ring to the discontinuous intermediate ring.

11. The system of claim 1, wherein an elevation of the horizontal plane of said inner ring is greater than an elevation of the horizontal plane of the outer ring.

12. A wire retaining ring configured for disposition on top of a coil of wire, the wire ring comprising:

an inner ring having an inner radius:

an outer ring having an outer radius, where the outer radius is larger than the inner radius and the outer ring is substantially concentrically disposed with regard to the inner ring;

a plurality of spokes each extending radially from the inner ring to the outer ring, the plurality of spokes intersecting the outer ring to create a plurality of segments along a circumference of the outer ring; and a plate extending radially from the inner ring to the outer ring, where the plate includes a slot having a slot width, the slot defining a discontinuity in the inner ring and extending in an arc from the inner ring to a position radially inward of the outer ring and disposed in a location in place of one of the plurality of spokes, the plate further including a tab extending partially across the slot at a location proximate the discontinuity in the inner ring.

13. The wire retaining ring of 12, further including:

a plurality of spokes that each extend radially from the inner ring to the outer ring, the plurality of spokes intersect the outer ring to create a plurality of segments along a circumference of the outer ring, the slot is disposed in a location in place of one of the plurality of spokes.

14. The wire retaining ring of claim 13, further including:

a discontinuous intermediate ring that has an intermediate radius, wherein the intermediate radius is greater than the inner radius and less than the outer radius, the intermediate ring is located between the inner ring and the outer ring, the intermediate ring is substantially concentrically disposed relative to the inner ring and the outer ring.

\* \* \* \* \*

UNITED STATES PATENT AND TRADEMARK OFFICE
CERTIFICATE OF CORRECTION

| | |
|---|---|
| PATENT NO. | : 8,967,520 B2 |
| APPLICATION NO. | : 13/429490 |
| DATED | : March 3, 2015 |
| INVENTOR(S) | : Herbert Matthews et al. |

Page 1 of 1

It is certified that error appears in the above-identified patent and that said Letters Patent is hereby corrected as shown below:

In the specification

In Col 1; ln 47, delete "and" and insert --end--.

In Col 11; ln 51, delete "no" and insert --so--.

Signed and Sealed this
Twenty-fourth Day of November, 2015

Michelle K. Lee
*Director of the United States Patent and Trademark Office*